April 23, 1963 P. J. NATHO 3,086,745
HYDRAULIC OPERATOR FOR RECIPROCATING GATE VALVES
Filed March 6, 1961 2 Sheets-Sheet 1

Paul J. Natho
INVENTOR.

BY Russell E. Schloff
ATTORNEY

Paul J. Natho
INVENTOR.
BY Russell E. Dehloff
ATTORNEY

United States Patent Office 3,086,745
Patented Apr. 23, 1963

3,086,745
HYDRAULIC OPERATOR FOR RECIPROCATING GATE VALVES
Paul J. Natho, Houston, Tex., assignor to ACF Industries Incorporated, New York, N.Y., a corporation of New Jersey
Filed Mar. 6, 1961, Ser. No. 93,632
7 Claims. (Cl. 251—62)

This invention relates generally to improvements in gate valves, and more particularly to a novel hydraulic cylinder operator for use with a through conduit reciprocating gate valve.

The petroleum industry, particularly for wellhead and transmission, makes extensive use of through conduit gate valves, that is, gate valves having valve members which in the open position form a portion of the bore through the valve thereby presenting an unbroken smooth wall conduit in which there is no more pressure drop than an equal length of pipe. With the advent of automation, it has become desirable to provide such through conduit gate valves with an operator. Since gate valves operate by reciprocatory movement, one type of operator used very frequently is the hydraulic cylinder. The piston of the operator is attached to the stem of the valve and by applying hydraulic pressure to one side or other of the piston the stem is extended or retracted. Since the valve member is attached to the stem, the reciprocating movement of the stem opens and closes the valve.

Since automated valves may be situated in remote locations, it is desirable that they be provided with fail-safe means which will automatically come into play should the hydraulic system operating the hydraulic cylinder fail. Depending upon the requirements, this fail-safe feature will automatically either open or close the valve in the event of failure of the hydraulic system.

The present invention contemplates a novel hydraulic operator assembly for a through conduit valve wherein the hydraulic operating cylinder having a fail-safe feature is attached directly to the top of the valve. The fail-safe feature is accomplished by a spring which surrounds the operating cylinder and is connectively attached to a portion of the stem which extends through the top of the operator. This construction maintains the overall length of the valve and operator to a minimum. Moreover, gate valves, by their inherent characteristics, require an extensive length of travel and in some instances considerable forces. The construction of the present operator satisfies these requirements. To permit application of protective coatings to a smooth surface when the assembly is used in adverse environmental locations, the entire operator assembly is encased by a cover which provides sufficient height to accommodate the expanded assembly.

An important object of this invention is to provide a combined through conduit valve and hydraulic operator assembly having a fail-safe feature wherein the spring providing the fail-safe feature surrounds the hydraulic operator thereby providing the necessary forces to assure positive and full movement of the valve member.

Another object of the invention is to provide a novel hydraulic cylinder operator assembly of minimum overall height in which the operator is fully encased.

A further object is to provide a hydraulic cylinder operator assembly in which provision is made to supply pressure to the top side of the operating piston from the base of the operator.

A still further object is to provide a through conduit gate valve having a stem passing through a plastic packing box in a bonnet with a hydraulic operator attached to the bonnet and provided with means permitting the replenishing of the plastic packing.

Other and further objects of the invention will be obvious upon an understanding of the illustrative embodiments about to be described, or will be indicated in the appended claims, and various advantages not referred to herein will occur to one skilled in the art upon employment of the invention in practice.

A preferred embodiment of the invention has been chosen for purpose of illustration and description and is shown in the accompanying drawing, forming a part of the specification, wherein.

Figure 1:
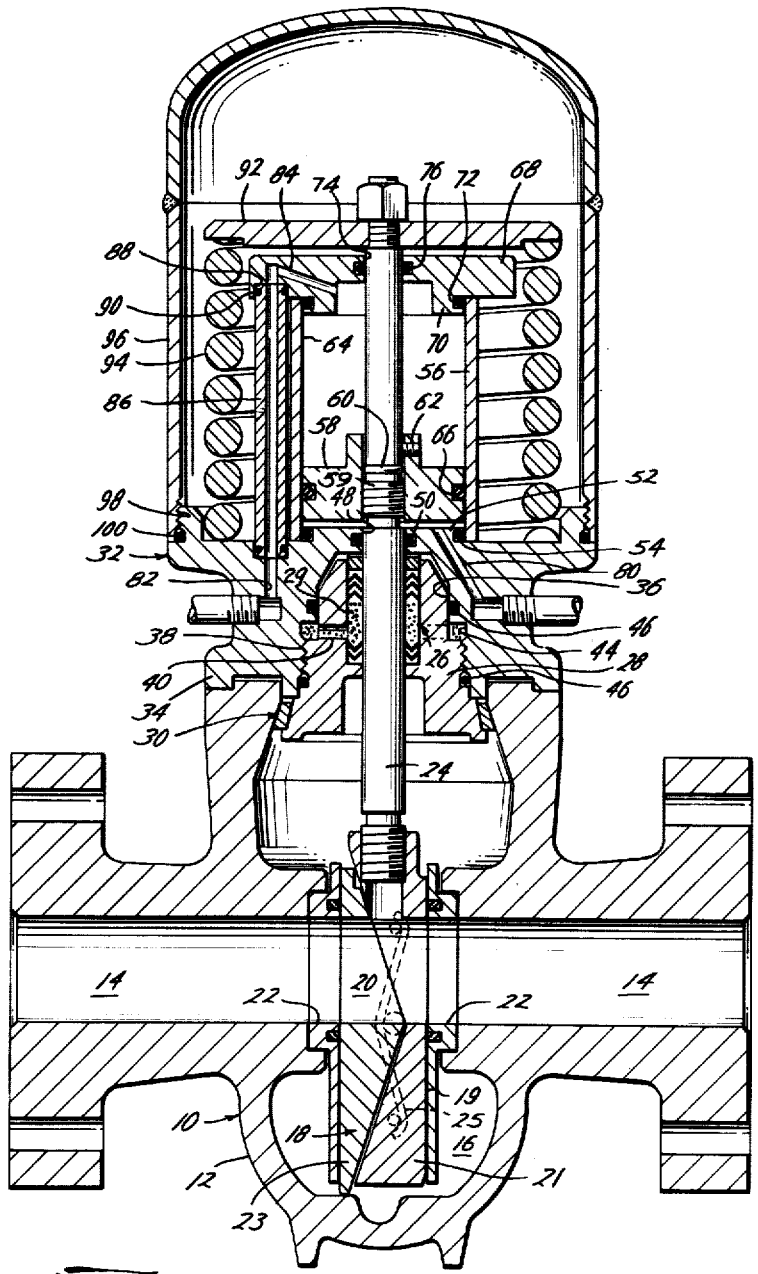
FIG. 1 is a vertical sectional view through a combined valve and operator constructed in accordance with this invention.
Figure 3:
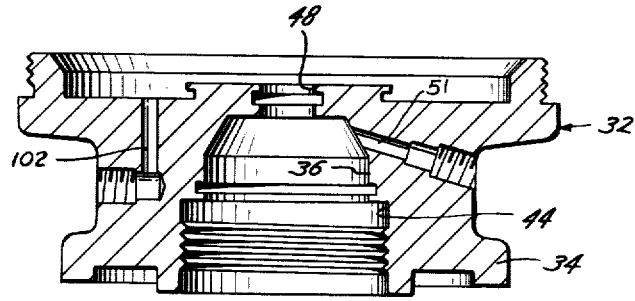
FIG. 3 is a vertical section of the base member of the operator oriented at 90° to the view shown in FIG. 1.
Figure 2:
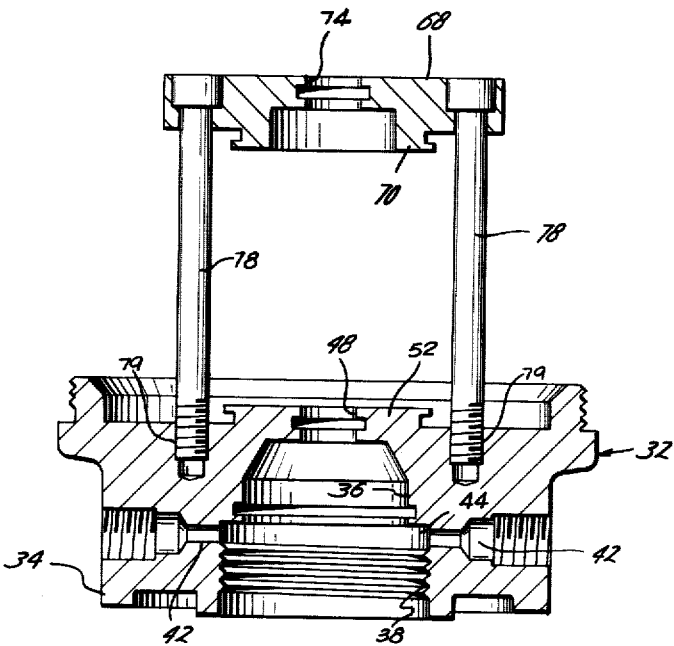
FIG. 2 is a vertical section of a portion of the operator assembly oriented at 45° to the view shown in FIG. 1.

Referring to the drawings in detail, reference character 10 generally designates a through conduit gate valve which includes a valve body 12 having a bore 14 extending therethrough. Intersecting the bore 14 is a valve chamber 16 in which is positioned a reciprocating valve member 18. The valve member 18 has a passage 20 which in the open position is aligned with the bore 14 forming a smooth conduit for the uninterrupted passage of flow therethrough, and a solid portion 19 which in the closed position of the valve cooperates with seat member 22—22 to block flow through the bore 14. An operating stem 24 is attached to an end of the valve member 18 to provide means to move the valve member 18 from one position to another. The valve member 18 shown in FIG. 1 is of the parallel expanding double wedge type. The valve member 18 consists of a gate 21 to which the stem 24 is connected and a segment 23. Both the gate 21 and segment 23 have flat faces which form the sealing faces of the valve member 18 and cooperate with the seats 22—22. The opposed mating surfaces of the gate and segment are angularly disposed from approximately the center to form two sets of wedges permitting the gate assembly 18 to be expanded at the open and closed position. A spring 25 or other means connects the gate 21 and segment 23 together and collapses the unit when not wedged apart. While moving to open or close the valve, the gate 21 and segment 23 match on all four angular surfaces and the overall width between the sealing faces of the valve member 18 is less than the distance between the seats 22—22. Thus the valve member 18 can be freely moved from one position to another. As the valve member 18 reaches the closed position, the travel of the segment 23 is arrested while the gate 21 continues to move causing the valve member 18 to expand thereby forcing the sealing faces of valve member 18 into intimate contact with the seats 22—22 assuring a tight seal about each seat 22.

The operating stem 24 extends past the top of the housing 12 and passes through a sealed passage 26 in a bonnet 28 which closes and seals the valve chamber 16. The drawings show a seal ring 30 positioned between the inner wall of the valve chamber and the bonnet, however any other of the well known means for sealing valve chambers may be used. A hydraulic cylinder operator 32 which will provide reciprocatory motion for the stem 24 is attached to the valve 10.

The hydraulic cylinder operator 32 is comprised of a base member 34 which attaches the operator 32 connectively to the valve 10. In the form shown in the drawings, the base member 34 has a centrally located counterbore 36 which telescopes over the bonnet 28. A portion of the outer wall of the bonnet 28 and a portion of the counterbore 36 are provided with threads 38 which are interengaged attaching the base member 34 to the valve.

The bottom of the base member 34 will bottom out on the top of the housing 12.

As previously mentioned, the stem 24 extends through a sealed passage 26 in the bonnet 28. The sealed passage 26 is formed by having a counterbore in the top of the bonnet 28 in which plastic packing 29 is placed between two sets of packing rings. The bonnet 28 is provided with passages 40 which permit replenishing of the plastic packing 29 thereby permitting the stem 24 to be repacked while the valve is in operation. The base member 34 telescopes over the bonnet 28 and covers the passageway 40; therefore, the base member 34 is provided with passageways 42 which will permit the injection of plastic packing 29 into an annular groove 44 formed between the bonnet 28 and base member 34 and thence through the passageways 40 into the sealed passage 26. To assure that the plastic packing 29 remains within the annular groove 44, the base member and bonnet assembly are provided with O-rings 46—46, one on each side of the annular groove 44. Also, in the event of loss of packing, the O-rings 46—46 will prohibit the escape of the lading. The base member 34 is provided with a passage 48 through which the stem 24 extends. The passage 48 is provided with a groove in which there is positioned an O-ring 50 to prevent stem leakage from the cylinder which will be described forthwith. To assure that no leakage around the steam 24 past the sealed passage 26 will be trapped and possibly enter the operator, a drain passage 51 is provided in the base member 34.

The top of the base member 34 is provided with a raised annular portion 52 which is provided with an annular groove in its peripheral wall, in which is positioned an O-ring 54. A hollow cylindrical sleeve 56 having its axis concentric with the operating stem 24 is positioned over the peripheral wall of the raised annular portion 52 of the base 34. The cylindrical sleeve 56 forms the cylinder for the hydraulic operator. A piston 58 is secured to a portion of the operating stem 24. As can be seen in FIG. 1, a portion of the stem 24 and the hub of the piston 58 are provided with threads 59 which are threadedly engaged to secure the piston 58 to the operating stem 24. An O-ring 60 prevents leakage between the stem 24 and hub of the piston 58. Set screws 62 lock the piston 58 securely to the stem 24. The piston 58 cooperates with the inner wall 64 of the cylindrical sleeve. As is customary in hydraulic cylinders, the circumferential wall of the piston 58 which cooperates with the inner wall 64 of the cylindrical sleeve is provided with a groove in which there is positioned sealing means 66. The cylindrical sleeve 56 is provided with a cap 68 which has an annular raised portion 70 which fits inside the inner wall 64 of the cylindrical sleeve 56. To prevent leakage between the inner wall 64 and the peripheral wall of the annular raised portion 70, the peripheral wall of the annular raised portion 70 is provided with a groove in which there is an O-ring 72. The cap 68 is provided with a passage 74 through which the stem 24 extends. The passage 74 is provided with a groove in which there is positioned an O-ring 76 to prevent any leakage between the passage 74 and the stem 24. A number of threaded members 78 pass through holes in the cap 68 and are threadingly engaged in threaded apertures 79 in the base 34 to attach the cap 68 and base 34 together thereby forming the hydraulic cylinder.

The base member 34 is provided with a passage 80 which is in communication with the bottom of the cylinder. As previously mentioned, the entire operator 32 is encased and in order to provide hydraulic pressure on the top of the piston 58, there is a passage 82 in the base member 34 which connects with a passage 84 in the cap 68 through a tube 86 which is positioned in counterbores 88 in the cap 68 and base 34. O-rings 90—90 seal the tube 86 with the counterbores 88—88. Accordingly, the hydraulic pressure for both the top and the bottom of the piston 58 are connected through the base 34. Application of pressure to the passage 80 will cause the piston to move toward the cap 68 and if the passage 20 in the valve member 18 is located in the top half of the valve member 18 the valve member will close when there is pressure on the bottom of the piston 58. Pressure through the passage 82 will be directed to the top of the piston 58 to cause the piston 58 to move toward the base 34 correspondingly moving the valve member 18 toward the bottom of the valve and consequently align the passage 20 with the bore 14 thereby opening the valve. The pressure lines connected to the passages 80 and 82 can be connected to a 4-way valve or other control means which are well known in the art.

In the event that hydraulic pressure to the cylinder 56 should become interrupted through failure of the hydraulic system, it is desirable that the valve will always move to a predetermined position. In most installations this position is the closed position. Accordingly, the operator of the present invention has been provided with fail-safe means. This is accomplished by attaching an annular plate 92 to the top of the stem 24. The plate 92 has a diameter greater than the diameter of the cap 68. Positioned between the plate 92 and the base 34 and surrounding the cylinder 56 is a spring 94 of sufficient magnitude to move the valve to the closed position should at any time the pressure on the top of the piston 58 fail. If it is desired that the valve fail in an open position, the location of the passage 20 in the valve member 18 would be in the lower half of the valve member 18 rather than in the upper half as shown in FIG. 1. The upward movement of the valve member 18 is assisted by the pressure in the body inasmuch as there is no stem on the bottom end of the valve member, the difference in area acted on by the pressure in the body will tend to force the valve member upward. However, if the valve member is of the parallel expanding double wedging type such as shown in FIG. 1, it is desirable to have the spring 94 of sufficient magnitude to initially collapse the valve member 18 to permit fluid to enter the valve chamber 16. After pressure has entered the valve chamber 16, the movement of the valve member 18 toward the closed position will be assisted by the pressure in the valve chamber 16. In order to provide positive closure and expansion of the valve member 18 in the closed position, the spring 94 again comes into play to actually provide the force necessary to cause the expansion of the valve member 18 to tightly seal the valve. Since the length of travel of a through conduit gate valve is of considerable length and the forces required to collapse and expand a double parallel expanding wedge gate valve member considerable it is essential that the spring 94 be of sufficient magnitude to provide the necessary force even at its terminal end of travel. It has been found that by utilizing a spring having sufficient diameter to surround the cylinder that the length of travel and force could be most easily obtained. Also the overall height of the assembly is maintained at a minimum. If the operator 32 is provided with a spring 94 it is not necessary to put pressure on the bottom of the piston 58 through passage 80; since the spring 94 will always close the valve anytime there is not sufficient hydraulic pressure on top of the piston 58 holding the piston at the bottom of the cylinder 56. Consequently, in such case passage 80 only serves as a vent.

In order that the spring 94 and the operator itself will not be subject to deleterious effects of adverse environmental conditions, the operator 32 is enclosed by a cover 96 which is threadingly engaged with a shoulder 98 of the base 34. An O-ring 100 sealingly engages the cover. The cover 96 should be of such height to accommodate the expanded assembly. The cover 92 permits the application of protective coating to a smooth surface. To permit venting the inside of the cover 92 a vent 102 is located in the base 34.

By having the spring 94 surround the cylinder 56, the overall length of the combined valve and operator is maintained at a minimum. This construction also readily permits the enclosing of the entire operator and spring assembly by the cover 96. The size of the combined valves and operators is particularly essential if the valve and operator assembly is to be used for underseas operation where the entire assembly will be placed in a further sealed container. It is for such instances that the vents 80, 51 and 102 are threaded to permit the attachment of vent lines to the surface or to a container at approximate atmospheric or other desirable pressure and provided for this purpose.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

What I claim is:

1. A combined through conduit gate and hydraulic operator comprising:
   a through conduit gate valve formed of a housing having a bore therethrough which is intersected by a valve chamber;
   a reciprocating two-piece valve member assembly located in said valve chamber having a passage which in the open position aligns with the bore and a solid portion which in the closed position blocks flow through the bore and in both positions expands to sealingly engage with both the upstream and downstream seats and collapses prior to moving from one position to another;
   an operating stem attached to the passage containing end of said valve member to move said valve member from one position to another, said stem extending past the top of the housing;
   a bonnet closing the valve chamber and provided with a packing box having renewable plastic packing through which the operating stem extends;
   a hydraulic cylinder operator connectively attached to the operating stem of said valve comprising:
      (a) a base member for the operator having a portion that permits it being telescoped over the bonnet of the valve, a sealed passage for the stem and an annular portion attached to the valve,
      (b) means formed by the bonnet and base member to supply plastic packing to the packing box in the bonnet,
      (c) a hollow cylindrical sleeve having its central axis concentric with the operating stem positioned over the annular portion of the base member,
      (d) a piston cooperating with the inner wall of the cylindrical sleeve secured to the operating stem,
      (e) a cap for the cylindrical sleeve provided with means securing the cylindrical sleeve to the base and provided with a sealed passage through which the operating stem extends,
      (f) means establishing a seal between the connection of the cylindrical sleeve with the base member and the cap,
      (g) means forming a passage from the base member to the cap to permit the furnishing of hydraulic pressure to the top of the piston connections in the base member,
      (h) an annular plate having a larger diameter than the cap for the cylindrical sleeve secured to the top end of the operating stem,
      (i) a coil spring surrounding the cylindrical sleeve and having one end in contact with the base member and the other end in contact with the top plate, said spring being of sufficient magnitude to collapse the valve member assembly and move it to the closed position and reexpand it into sealing contact with the seats upon failure of pressure to the top of the piston,
      (j) a cover sealingly attached to the base member encasing the cylinder and spring and being of sufficient height to accommodate the expanded assembly.

2. A hydraulic cylinder operator connectively attached to an operating stem of a reciprocating gate valve which includes a housing comprising:
   a base member of for the operator having an annular raised portion and a sealed passage for the stem attached to the housing of the valve;
   a hollow cylindrical sleeve having its central axis concentric with the operating stem positioned over the annular raised portion of the base member;
   a piston cooperating with the inner wall of the cylindrical sleeve secured to the operating stem;
   a cap for the cylindrical sleeve provided with means securing the cylindrical sleeve to the base and provided with a sealed passage through which the operating stem extends;
   means establishing a seal between the connections of the cylindrical sleeve with the base member and the cap;
   means forming a passage from the base member to the cap to permit supplying hydraulic pressure to the top of the piston through a connection in the base member;
   an annular plate having a larger diameter than the cap secured to the top end of the operating stem;
   a coil spring surrounding the cylindrical sleeve and having one end in contact with the base member and the other end in contact with the top plate;
   a cover sealingly attached to the base member encasing the cylinder and spring and being of sufficient height to accommodate the expanded assembly.

3. A hydraulic cylinder operator connectively attached to an operating stem of a reciprocating gate valve which includes a housing comprising:
   a base member for the operator having an annular raised portion and a sealed passage for the stem attached to the housing of the valve;
   a hollow cylindrical sleeve having its central axis concentric with the operating stem positioned over the annular raised portion of the base member;
   a piston cooperating with the inner wall of the cylindrical sleeve secured to the operating stem;
   a cap for the cylindrical sleeve provided with means securing the cylindrical sleeve to the base and provided with a sealed passage through which the operating stem extends;
   means establishing a seal between the connections of the cylindrical sleeve with the base member and the cap;
   means forming a passage from the base member to the cap to permit supplying hydraulic pressure to the top of the piston through a connection in the base member;
   an annular plate having a larger diameter than the cap secured to the top end of the operating stem;
   a coil spring surrounding the cylindrical sleeve and having one end in contact with the base member and the other end in contact with the top plate.

4. A combined reciprocating gate valve and hydraulic operator comprising:
   a gate valve formed of a housing having a bore therethrough which is intersected by a valve chamber;
   a reciprocating valve member located in said valve chamber which in the closed position blocks flow through the valve;
   an operating stem attached to said valve member to move said valve member from one position to another, said stem extending past the top of the housing;
   a bonnet closing the valve chamber and provided with a packing box having renewable plastic packing through which the operating stem extends;

a hydraulic cylinder operator connectively attached to said stem, said operator comprising:
   (a) a base member for the operator having a portion that permits it being telescoped over the bonnet of the valve, a sealed passage for the stem and an annular portion attached to the valve;
   (b) means formed by the bonnet and base member permitting plastic packing to be injected to the packing box in the bonnet through a connection in the base,
   (c) a hollow cylinder having a central axis concentric with the operating stem positioned over the annular portion of the base member,
   (d) a piston co-operating with the inner wall of said cylinder secured on the operating stem,
   (e) a cap for the cylinder having means securing the cylinder to the base and having a sealed passage through which the operating stem extends,
   (f) means establishing a seal between the connections of the cylindrical sleeve with the base member and cap,
   (g) a plate having a larger diameter than the cap attached to the top of the operating stem,
   (h) means forming a passage from the base member to the cap to permit the furnishing of hydraulic pressure to the top of piston through a connection in the base member,
   (i) a coil spring surrounding the cylinder and having one end on contact with the base and the other end in contact with the top plate,
   (j) a cover attached to the base encasing the cylinder and spring and being of sufficient height to accommodate the expanded assembly.

5. A combined reciprocating gate valve and hydraulic operator comprising:

a gate valve formed of a housing having a bore therethrough which is intersected by a valve member;

a reciprocating valve member located in said valve chamber which in the closed position blocks flow through the valve;

an operating stem attached to said valve member to move said valve member from one position to another, said stem extending past the top of the housing;

a bonnet closing the valve chamber and provided with a packing box having renewable plastic packing through which the operating stem extends;

a hydraulic cylinder operator connectively attached to said stem, said operator comprising:
   (a) a base member for the operator having a portion that permits it being telescoped over the bonnet of the valve, a sealed passage for the stem and an annular portion attached to the valve;
   (b) means formed by the bonnet and base member permitting plastic packing to be injected to the packing box in the bonnet through a connection in the base,
   (c) a hollow cylinder having a central axis concentric with operating stem positioned over the annular portion of the base member,
   (d) a piston co-operating with the inner wall of said cylinder secured on the operating stem,
   (e) a cap for the cylinder having means securing the cylinder to the base and having a sealed passage through which the operating stem extends,
   (f) means establishing a seal between the connections of the cylindrical sleeve with the base member and cap,
   (g) a plate having a larger diameter than the cap attached to the top of the operating stem,
   (h) means supplying hydraulic pressure to the top of the piston,
   (i) a coil spring surrounding the cylinder and having one end in contact with the base and the other end in contact with the top plate.

6. A hydraulic cylinder operator connectively attached to a reciprocating operating stem of a valve, said operator comprising:
   (a) a base member for the operator having a sealed passage for the stem and an annular portion attached to the valve,
   (b) a hollow cylinder having a central axis concentric with operating stem positioned over the annular portion of the base member,
   (c) a piston co-operating with the inner wall of said cylinder secured on the operating stem,
   (d) a cap for the cylindrical sleeve having means sealingly securing the cylindrical sleeve to the base and having a sealed passage through which the operating stem extends,
   (e) a plate having a larger diameter than the cap attached to the top of the operating stem,
   (f) a coil spring surrounding the cylinder and having one end in contact with the base and the other end in contact with the top plate,
   (g) a cover attached to the base encasing the cylinder and being of sufficient height to accommodate the expanded assembly.

7. A hydraulic cylinder operator connectively attached to a reciprocating operating stem of a gate valve, said operator comprising:
   (a) a base member for the operator having a sealed passage for the stem attached to the valve,
   (b) a hollow cylinder having a central axis concentric with operating stem positioned over the base member,
   (c) a piston co-operating with the inner wall of said cylinder secured on the operating stem,
   (d) a cap for the cylindrical sleeve having means sealingly securing the cylindrical sleeve to the base and having a sealed passage through which the operating stem extends,
   (e) a plate having a larger diameter than the cap attached to the top of the operating stem,
   (f) a coil spring surrounding the cylinder and having one end in contact with the base and the other end in contact with the top plate.

References Cited in the file of this patent

UNITED STATES PATENTS

| | | |
|---|---|---|
| 1,652,879 | Standerwick | Aug. 18, 1924 |
| 2,148,628 | Laurent | Feb. 28, 1939 |

UNITED STATES PATENT OFFICE
CERTIFICATE OF CORRECTION

Patent No. 3,086,745                              April 23, 1963

Paul J. Natho

It is hereby certified that error appears in the above numbered patent requiring correction and that the said Letters Patent should read as corrected below.

Column 3, line 27, for "steam" read -- stem --; column 6, line 10, for "member of for" read -- member for --; column 7, line 39, for "member" read -- chamber --; column 8, line 34 for "cylinder" read -- cylinder and spring --.

Signed and sealed this 1st day of October 1963.

(SEAL)
Attest:

ERNEST W. SWIDER                          DAVID L. LADD
Attesting Officer                              Commissioner of Patents